United States Patent [19]

Pieri et al.

[11] Patent Number: 4,709,191

[45] Date of Patent: Nov. 24, 1987

[54] PROCESS FOR ADJUSTING A DEFLECTION UNIT FOR A THREE ALIGNED GUN TELEVISION TUBE AND DEVICE FOR REDUCING TO PRACTICE SAID PROCESS

[75] Inventors: Roger Pieri, Genlis; Jean C. Fringant, Dijon, both of France

[73] Assignee: Videocolor, Montrouge, France

[21] Appl. No.: 776,631

[22] Filed: Sep. 16, 1985

[30] Foreign Application Priority Data

Sep. 21, 1984 [FR] France ............................ 84 14569

[51] Int. Cl.$^4$ ............... H01J 29/56; H04N 17/02; G01R 33/00
[52] U.S. Cl. ................................. 315/370; 315/368; 358/10; 324/404; 324/260
[58] Field of Search .................. 315/368, 370; 358/10, 358/67; 324/260, 404

[56] References Cited

U.S. PATENT DOCUMENTS

| | | | |
|---|---|---|---|
| 3,916,437 | 10/1975 | Barbin | 358/10 |
| 4,242,612 | 12/1980 | Heijnemans et al. | 313/421 |
| 4,254,432 | 3/1981 | Nakahata | 358/10 |
| 4,429,293 | 1/1984 | McGlashan | 313/421 |

FOREIGN PATENT DOCUMENTS

| | | | |
|---|---|---|---|
| 55-35218 | 3/1980 | Japan | 324/404 |
| 55-99882 | 7/1980 | Japan | 358/10 |
| 55-162070 | 12/1980 | Japan | 324/404 |

Primary Examiner—Theodore M. Blum
Assistant Examiner—David Cain
Attorney, Agent, or Firm—Cushman, Darby & Cushman

[57] ABSTRACT

The present invention relates to a process and a device for adjusting a deflection unit without utilizing a test tube whereby a measuring head is employed that samples the field along the length of the axis of the deflection unit in at least two zones, and the signals issuing from the measuring head represent the fields generated by the line and raster windings. These signals are connected to a computer that simulates the mechanical adjusting operations such that the error signal supplied to a servo-device may control the displacement motors of the raster with respect to the center line of the deflection unit.

14 Claims, 12 Drawing Figures

PROCESS FOR ADJUSTING A DEFLECTION UNIT FOR A THREE ALIGNED GUN TELEVISION TUBE AND DEVICE FOR REDUCING TO PRACTICE SAID PROCESS

BACKGROUND OF THE INVENTION

Field of the invention

The present invention concerns a deflection unit for a television tube having three aligned guns. It also concerns an apparatus and process for adjusting the deflection unit. It can have various applications in the field of large-scale manufacture of deflection units and in the field of assembling deflection units of television tubes intended for use by the general public.

Description of the Prior Art

According to the processes of the prior art, it is known to manufacture magnetic deflection units comprising a line winding and a raster winding, thereby realizing a scanning for generating a high-quality coloured picture. These deflection units achieve, by modelling the magnetic field lines, self-convergence an various corrections to the picture are made which were previously carried out by assistance circuits. However it is necessary to carry out a very precise adjustment of the deflection unit. In fact, this unit comprises, on a conical separator, a ferrite bearing a toroidal winding for raster scanning. A winding in the form of a saddle for line scanning is fixed inside the separator, and the ferrite is mounted movably upon the separator. The deflection unit only functions if:

the two windings are correctly situated with respect to each other; and the deflection unit itself is correctly situated on the neck of the tube upon which it is mounted.

The adjustment of the deflection unit is conventionally carried out in two operations. The first operation is conducted once the process for manufacturing the deflection unit has been carried out, and the deflection unit is thus stuck in such a way as to secure this adjustment. The second operation is carried out upon mounting of the tube during assembly of the various components.

The major drawback with this process is that it is necessary to utilize a test or trial tube for the first operation in order to display a test pattern. To do this, sampling is carried out by statistical methods using a series of test tubes intended for the first operation. Each test tube presents mean characteristics that allow an adjustment of the deflection unit according to the first operation to be transportable to another tube. However, the selection of the test series is a delicate operation. Each deflection unit is brought, after manufacture, to an adjustment station according to the first operation. An operator places the deflection unit upon the neck of a test tube mounted within a darkroom and links up the connections of the windings of the deflection unit to a test pattern generator. By displaying the test patterns it is possible to measure four convergence defects or faults known as vertical and horizontal amplitudes and vertical and horizontal crossings or intersections. The first operation is performed to reduce these four test pattern defects. The drawbacks are considerable and include the problem of selecting a test tube;

the necessity of an operator's presence for the visual appreciation of a dimensional fault or defect upon a picture;

the slowness due to the manual character of the handling operations;

the necessity of providing a large number of stations, all similar in character, for adjusting the large-scale production of deflection units and;

the high cost per unit at each station.

SUMMARY OF THE INVENTION

The present invention aims at overcoming having to select a television tube according to complicated procedures which, due to their complexity, introduce an error that is distributed throughout the manufacturing process.

The present invention also aims at avoiding the need of visual appreciation of a test pattern, such subjective evaluations varying according to the individual operator.

Another aim of the present invention is to limit and even to eliminate completely manual interventions in the first adjustment operation. High rates of adjustment are thus achieved, and the time spent for adjustment is less than one-fifth the former time taken.

Yet a further aim of the present invention is to propose a process and an apparatus which greatly reduces cost compared to those of the prior art.

After adjustment according to the first operation, the adjusted deflection unit is stuck, i.e., the ferrite which bears the raster is rendered immobile on its separator and thus becomes steady with respect to the line. The deflection unit, with the exception of annexed operations, is thus a finished product that is furnished to the manufacturer of television tubes. This manufacturer must then carry out a second operation: adapt the deflection unit to the television tube to which it is intended. Each tube thus arrives at a station similar to that described above. It is received and controlled by an operator who receives the deflection unit, mounts the deflection unit on the neck of the tube, and displays thereon a test pattern similar to that of the first operation. The operator must once again minimize the four defects of the test pattern mentioned above by displacing axially the deflection according to the line scanning axis or the raster scanning axis. In order to do this, the deflection unit is fixed to the rear and the arms allowing the forward displacement of the deflection unit according to the two above-mentioned axes are handled by the operator.

The drawbacks inherent in this second operation are especially the following:

the tube intended for a given deflection unit can have fairly different characteristics in the measurement of the statistical class of the selection of the test tube of the first operation the adjustment of the four faults can only be made with two independent parameters; when the displacements of the deflection unit along the length of the line scanning direction and the length of the raster scanning direction are corrected, the operator is restricted to performing a non-determinable setting off of the four faults.

The present invention aims at avoiding the difference in characteristics between the test tube of the first operation and the television tube upon which the deflection unit will be definitively mounted.

Furthermore, the invention aims at limiting the adjusting labour of the operator by reducing the possible variations of the four faults by transposing part of the adjustments of the second operation during the first operation.

The present invention thus concerns a process for adjusting a deflection unit for a television tube of three aligned guns. The process according to the present invention consists essentially of:
1. disposing the deflection unit upon a head for measuring the field gradients;
2. measuring these gradients;
3. displacing about the central magnetic axis the support ferrite of the raster winding so as to obtain orthogonality of the raster and line fields;
4. simulating an alignment of the deflection unit in a television tube by furnishing a voltage proportional to the angular shift between the axis of the head and each mean axis of symmetry of the raster and line fields;
5. displacing the ferrite in at least one direction of the plane orthogonal to the axis of the measuring head in such a way as to cancel out the voltages proportional to the shifts; and
6. fixing or steadying, at least temporarily, the ferrite with respect to the line winding.

The present invention also concerns a device for adjusting a deflection unit by applying the process according to the invention. Such a device comprises support means and centering means, firstly for the deflection unit itself, and secondly for one winding with respect to the other. The device also comprises a head for measuring the field gradients which are furnished by a computer which makes use of the parameters of the invention. Furthermore, the device according to the invention also comprises two supply lines of line and raster scanning simulation data and servo-centering means such as that mentioned above.

BRIEF DESCRIPTION OF THE DRAWINGS

Other features, objects and advantages of the present invention will become apparent from reading the following description given with reference to the appended drawings in which.

DETAILED DESCRIPTION OF THE INVENTION

Figure 1:
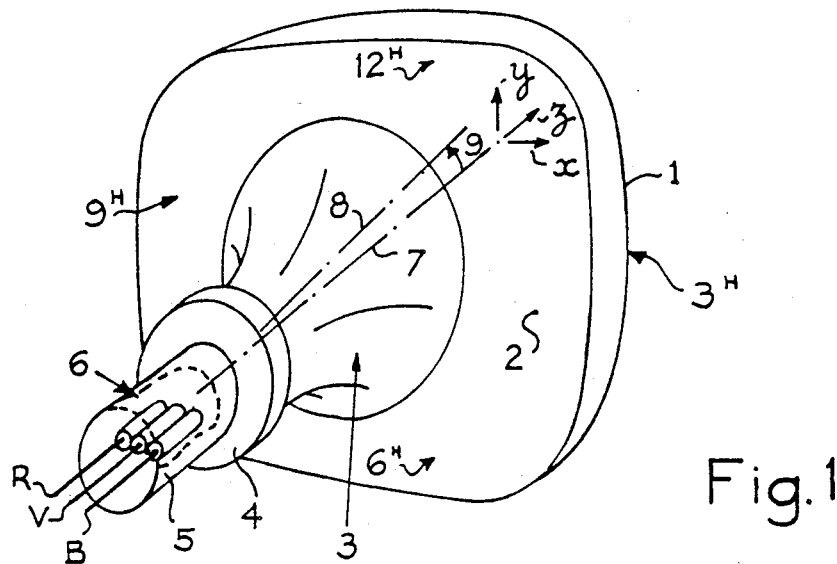
FIG. 1 is a rear view of a television tube fitted with a deflection unit.

FIG. 1 represents the detection unit as seen from the rear of a television tube. The television tube comprises a screen 1 mounted upon a widened portion 2, the end of which is constituted by a neck 5. The neck 5 contains an assembly 6 constituted by three aligned guns, each allocated to successive colours red, green, and blue. On the neck of the tube is disposed a deflection unit 3, the general form of which is similar to that of a collar that is adjusted to the connection between the cylindrical portion of the neck and the widened portion 2 of the rear of the screen 1.

FIG. 1 illustrates the problem raised in particular by the second adjusting operation described above. In fact, through its construction the tube admits a central axis 7 corresponding to the axis of convergence of the deflection assembly 3. Upon mounting of the deflection unit, the unit is generally disposed according to a magnetic axis which is represented by an axis 8 forming with the axis 7 a reference angle 9 that is to be eliminated by alignment. Mechanical methods being inoperable for this type of adjustment, it is known according to the prior art to check the magnetic components of the tube, in particular its convergence, by distortions of the test pattern displayed upon the screen. With this aim, the four characteristics points of the screen are designated by their locations on a clockface: 12H, 3H, 6H, and 9H. The axis 9 has also been a trihedron reference x, y, z, axis z being the general axis of propagation of the electron beams issuing from the guns in the absence of deflection, axis x substantially reproducing the line scanning direction and axis y the raster scanning direction.

Figure 2:
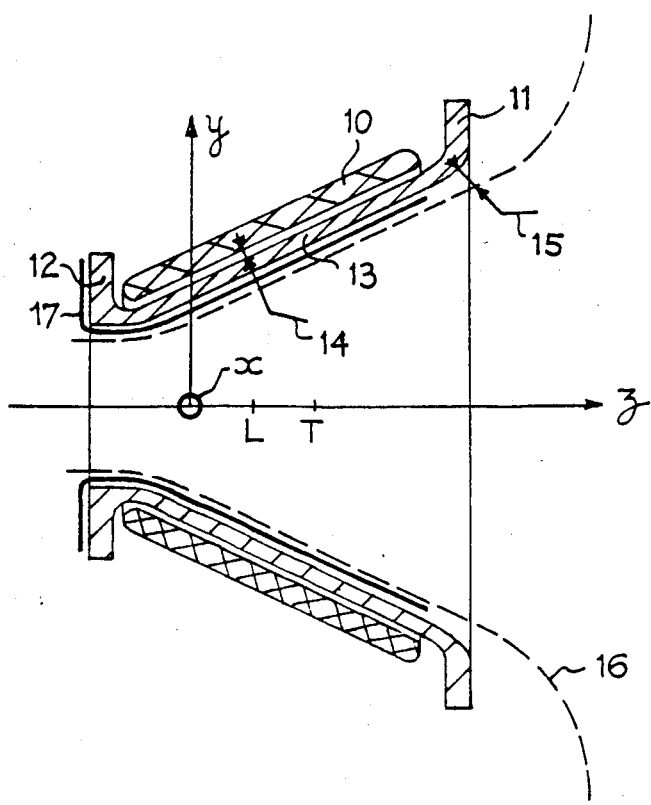
FIG. 2 is a partial cross-section of the television receiver set equipped according to FIG. 1.

FIG. 2 represents a partial cross-section of a television tube similar to that represented in FIG. 1. The deflection unit is installed upon the glassware 16 of the tube represented partially by broken lines. It comprises essentially a separator 11–13 made of plastic material which supports a first winding 10 and a second winding 17. The first winding 10 is constituted by a solenoidal or toroidal winding disposed about a core made of ferrite having a more or less conical form. The winding 17 is constituted by a heat-formed winding in the form of a horse's saddle installed within the recess of the separator 11 in the space 15 available between the saddle and the widened portion of the tube. The first winding 10 is allocated to the raster scanning and the second winding 17 to the line scanning. Such a deflection unit is called a saddle-tore type deflection unit.

It is apparent from FIG. 2 that it is possible, along the length of the axis z, to distinguish a centre of deflection of line L and a raster deflection centre T. In order to minimize the geometrical and convergence faults, it is appropriate that the two centres of deflection- line L and raster T- be aligned upon this axis z that is also the axis 9 of this tube. In order to do this in the type of saddle-tore deflection unit, two adjustment parameters are available: a displacement of the winding 10 according to the axis x or, on the other hand, according to the axis y. In fact, it will be noted that between the tore 10 and the separator 11 there exists a shift space 14 that allows displacements of about 1 millimeter. It is this displacement operation according to x that allows the adjustment according to the first operation described above.

Figure 3:
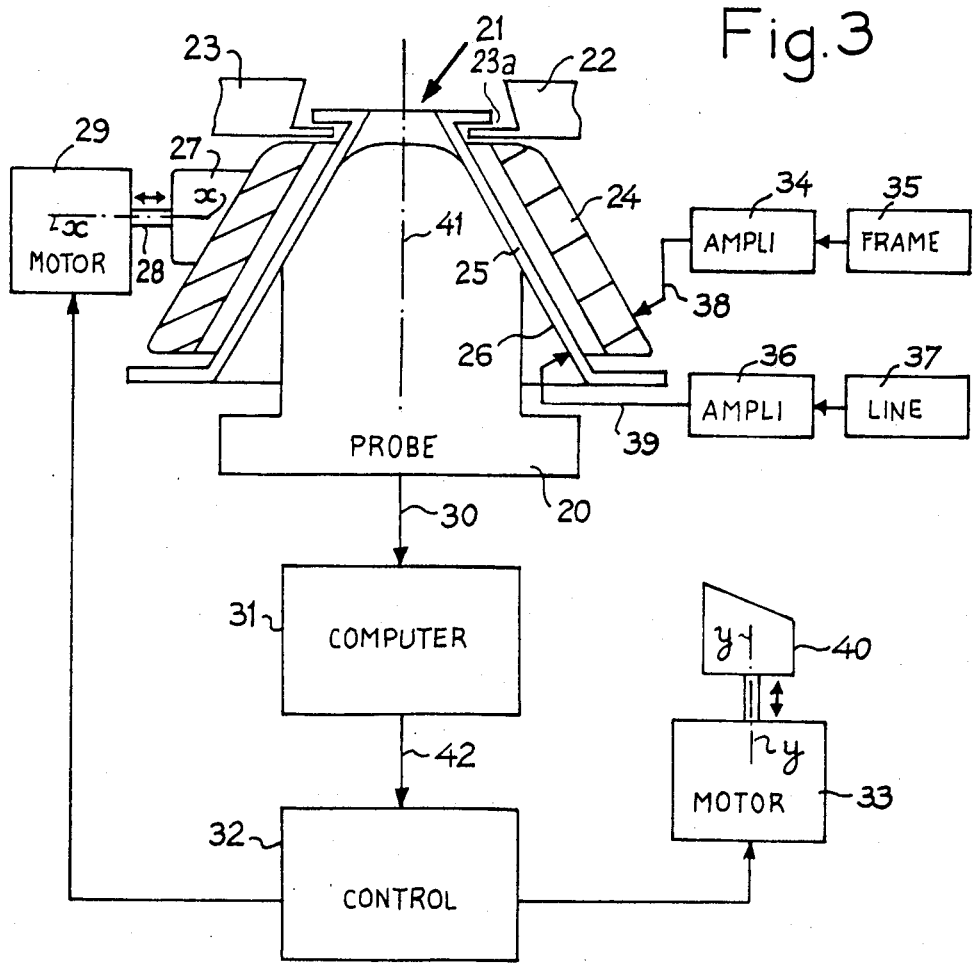
FIG. 3 is a synoptic view of a device reducing to practice the process according to the invention.

FIG. 3 describes the block diagram of a device carrying out the process according to the present invention. A device according to the present invention comprises essentially centering means 22 and positioning means 23 for the deflection unit 21 with respect to the measuring head 20. It also comprises positioning and centering means 27–29 and 33, 40. When the deflection unit 21 is disposed on the measuring head 20, the centering means 22 and positioning means 23, constituted for example by self-centering clamps, seize or grasp the deflection unit from the rear, i.e., by the smallest section of the deflection unit called the input area of the electron beams. The deflection unit rests upon a bearing 23a of the measuring apparatus so as to surround the measuring head 20. The deflection unit 21 comprises a part 24 constituted by the raster deflection winding mounted upon a ferrite which is movable with respect to the separator 25 and to the line deflection winding attached to this separator 25. The movable part 24 can be displaced by a device comprising elements 27–29 and 33 and 40 for positioning and centering the raster winding with respect to the line winding according to a first axis x and a second axis y which are substantially orthogonal.

The adjustment device according to the invention concerns essentially carrying out the first adjustment operation in a particular way which is peculiar to the process of the invention. In order to do this, it involves displacing according to axes x and y the ferrite 24 with respect to its fixed or steady separator 25 through centering means and support means 22, 23. The measuring head is aligned upon a central axis 41 that simulates a perfect magnetic axis. The axis 41 is similar to the central axis of the deflection unit when the direction of propagation of the electron beam is not deflected. In order to carry out measuring, two supply lines are provided one comprising elements 34, 35, and 38 associated with the raster scanning, and the other comprising elements 36, 37, and 39 associated with the line scanning. Each line comprises a raster frequency oscillator or a line frequency oscillator, an amplifier and a connection to the output cables of the raster or line windings 26. In a preferred embodiment, sinusoidal signals of frequencies respectively compatible with the line scannings and the raster scannings, which are non-multiples of one another, have been chosen for raster scanning being simulated at 285 Hz and line scanning at 3000 Hz.

The data 30 issuing from the measuring head 20 is supplied to a computer 31 that calulates the coefficients of the prior art which were measured by means of test patterns displayed upon the test tubes as described above. These four main parameters will be below with reference to FIGS. 4 and 5, and the structure of a measuring head adapted to the invention will be described with reference to FIGS. 6 to 9. The computer 31 supplies an error signal 42 that represents an analog or digital measurement of the voltages proportional to the angular shifts of the axes of the deflection unit with respect to the axis of the head. It helps determine a displacement of the axis x and of the axis y for carrying out this displacement in a first embodiment, and an operator adjusts manually by means of displacement screws the position of the ferrite 24 until the error signal 42, read for example on a galvanometer battery, has been cancelled.

In the FIG. 3 embodiment, however, signal error 42 is supplied to a servo-device 32 that delivers the power or an adjustment order to a motor 29 or a motor 33 responsible for the movements of a pad 27 for the axis x or 40 for the axis y, respectively. Pads 27 or 40 repel the ferrite. The movement of the ferrite on the deflection unit is thus always along the plane orthogonal to the axis 41, i.e., substantially along the axis of revolution of the deflection unit itself. The signals issuing from the servo-generator 32, as is well known to one skilled in the art, take into consideration the type of motor.

FIG. 3 represents schematically the positioning and centering means, 23 and 22, respectively. These means are essentially constituted by a self-centering clamp 22 and 23, the outline of which allows seizure of the rear crown of the deflection unit 21. When the clamp 22, 23 is actuated, its outline assists in centering and securing in position the rear of the deflection unit.

Figure 5:
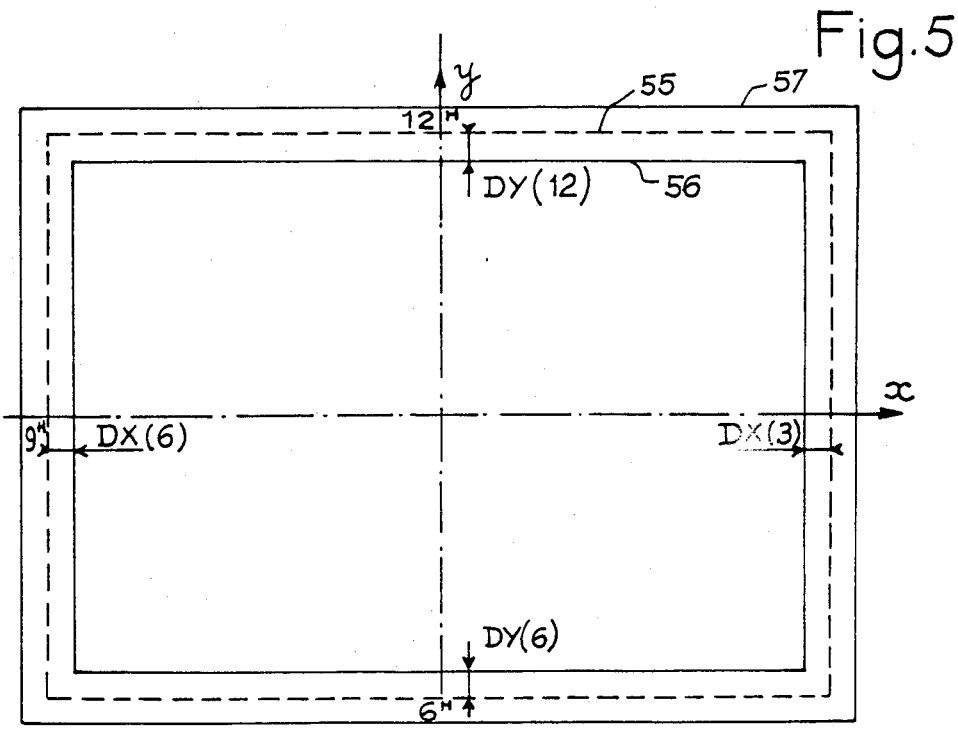
FIG. 5 is a second test pattern utilized in the process according to the invention.
Figure 4:
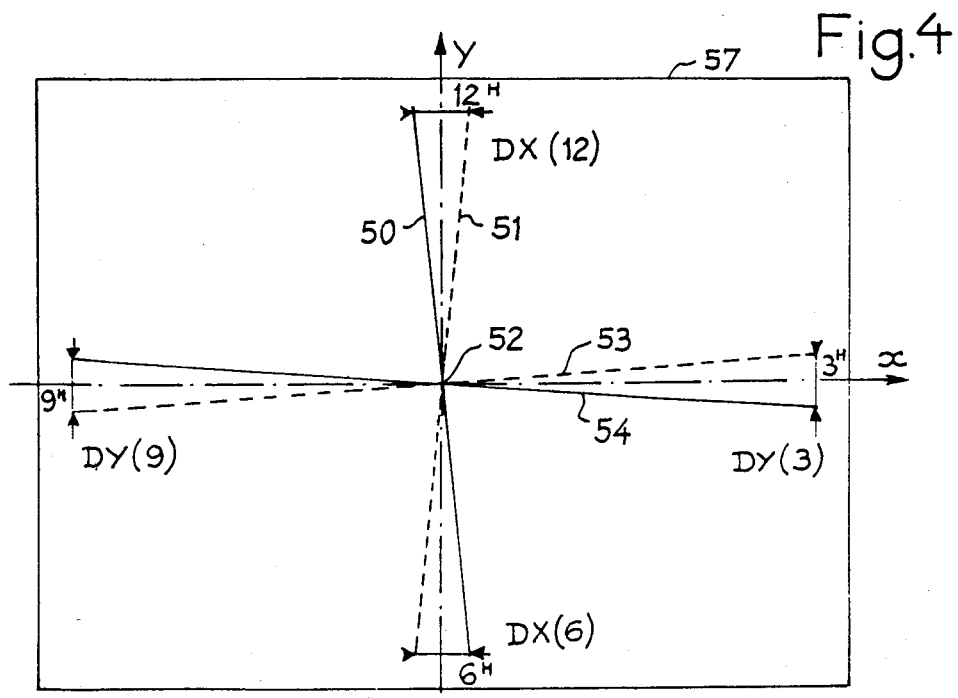
FIG. 4 is a first test pattern utilized in the process according to the invention.

FIGS. 4 and 5 represent a screen 57 upon which is displayed a series of test patterns according to the prior art in order to adjust the deflection units. By means of using said two figures the four characteristic parameters utilized by the invention will be explained.

FIG. 4 represents, inside the screen 57, a test pattern constituted by two crosses having a common centre positioned at the centre 52 of the screen, a first red being constituted by lines 50 and 54 and a second blue being constituted by lines 51 and 53. This intersection test pattern allows the measurement of the horizontal and vertical intersection parameters. On screen 57 the four cardinal points 3H, 6H, 9H, 12H have been defined and are associated to the axes y and x. The shifts between the ends of the blue and red crosses measure the deflection deflects provoked by incorrect positioning of the raster with respect to the line. The shifts DX(12) and DX(6) of the vertical ends of the crosses and the shifts DY(9) and DY(3) of the horizontal ends of the same two crosses are shown. It is thus possible to define a horizontal intersection coefficient by the relation:

$$CH = \tfrac{1}{2}(DY(9) - DY(3))$$

It is also possible to define a vertical intersection coefficient by the relation:

$$CV = \tfrac{1}{2}(DX(12) - DX(6))$$

It will be noted that the shifts introduced into the calculations of CH and CV correspond to the deflection maxima.

FIG. 5 represents a test pattern constituted by two rectangles which are respectively red and blue. The red rectangle 56 and the blue rectangle 55 allow measurement of the two amplitude coefficients; the horizontal AH and the vertical AV amplitude coefficients. As described above, the shifts are defined with their signs relative to the axes x and y by DX(3), DX(9), DX(12), DX(6).

The horizontal amplitude parameter AH is defined by the following relation:

$$AH = \tfrac{1}{2}(DX(3) - DX(9))$$

The vertical amplitude parameter AV is defined by the following relation:

$$AV = \tfrac{1}{2}(DY(12) - DY(6))$$

In the process according to the invention, with the measurement of these eight dimensions having been achieved, an operator must evaluate a first time for adjustment of the deflection unit and a second time during mounting of the deflection unit upon its final tube. It order to do this, the fact is used that these measurements correspond to maximal deflections in the planes containing the axes x and y. FIGS. 6 to 9 represent a deflection unit in section in which are measured the fields for avoiding the necessity of utilizing test patterns such as those described in FIGS. 4 and 5. Only the form 60 of the deflection unit is represented in the plane represented in each of FIGS. 6 to 9. The electron beams enter the zone at the rear of the deflection unit along the length of axis z. This rear zone has a narrower section than the output terminal section of the electrons.

In the definition of the four characteristic parameters utilized by the invention, it will be noted that the geometric elements are defined as differences between differences. Therefore, for each measuring point, the present invention involves recognizing the shift between a red trace and a blue trace that are at the deflection ends, these two traces being the furthest apart from each other among the three beams. In the output zone of the deflection unit, it is thus possible to dispose of sensors capable of measuring the field differences. One of the advantages of the present invention is that it has revealed that this gradient measurement allows the differences entering into the definition of the four parameters of a deflection unit adjustment to be represented.

Figure 6:
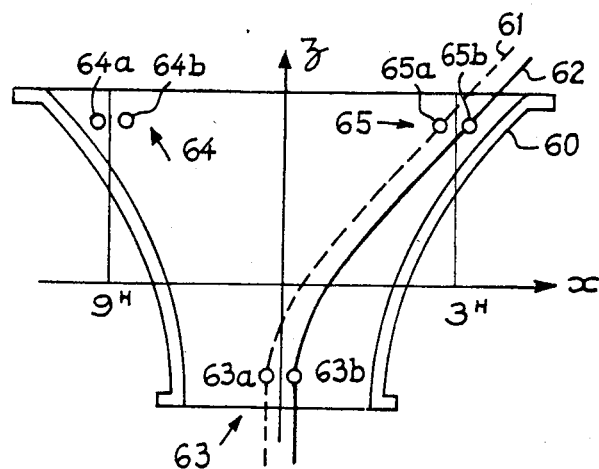
FIGS. 6 to 9 are diagrams explaining the operation of the head for measuring the field gradients.

FIG. 6 shows a section in which has been indicated the measuring zone of each field gradient utilized for the horizontal amplitude parameter AH. In the output zone of the deflection zone is disposed in the plane containing the axes x and y pairs of coils 64 and 65, the pair 64 being intended to measure the field gradient affecting the two extreme beams going towards an impact point 9H, and the pair of coils 65 being intended to measure the field gradient affecting the two extreme red and blue beams 61 and 62 going to point 3H of the screen. the absence of a tube means that the beams 61 and 62 are simply simulated. There is thus no charge crossing through the measuring device.

In order to recognise more specifically the errors that the deflection unit introduces into its input zone, a pair of coils 63 is disposed adjacent to axis z to enable the calculation of field gradient coefficients due the influence of the rear zone of the deflection unit. In the plane x the pairs of coils 64 and 65 are disposed substantially on the edge of the deflection volume. They are situated in the front zone in a locality the criteria for whose selection will be specified below. In order to measure the parameter AH, called the horizontal amplitude parameter, the coils are constituted by small solenoids, the axis of which is parallel to axis y.

Figure 7:
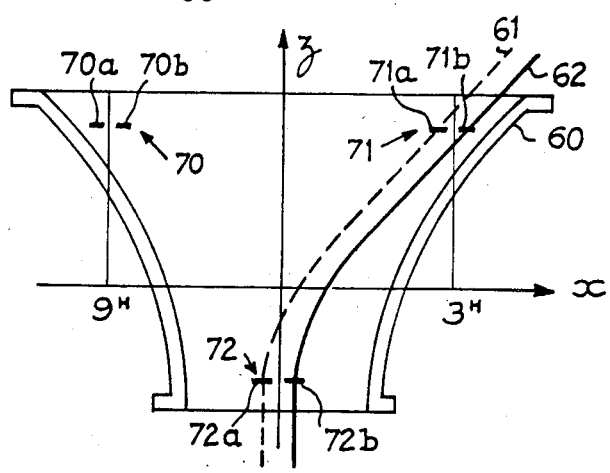

FIG. 7 represents a block diagram of the coils 70-72 for measuring the coefficient CH of horizontal intersection. The coils are solenoids having axes parallel to axis x, and they are disposed in plane x, y as explained above.

Figure 8:
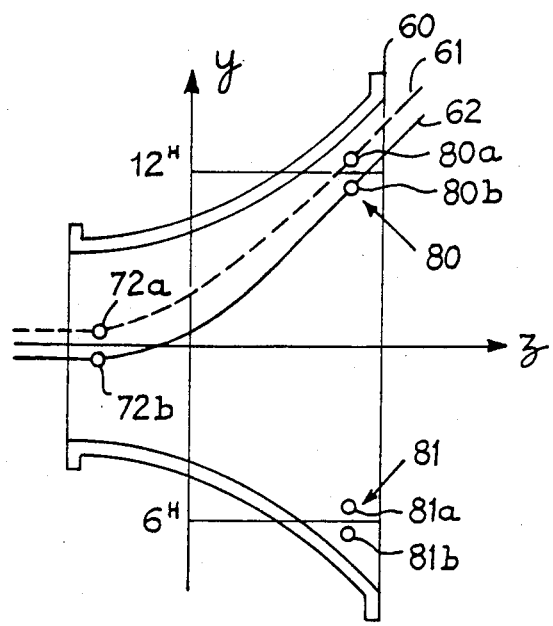

FIG. 8 represents a block diagram of the coils for measuring the vertical amplitude coefficient AV. The coils are disposed in the plane x, y and have an axis parallel to axis x. The pairs of coils 80, 81 situated in the front portion of the deflection unit correspond to the deflection point at 12H and at 6H on the test pattern of the prior art.

The rear pair of coils 72 is constituted by the pair of coils that is already utilized in FIG. 7 for measuring the horizontal intersection parameter CH.

Figure 9:
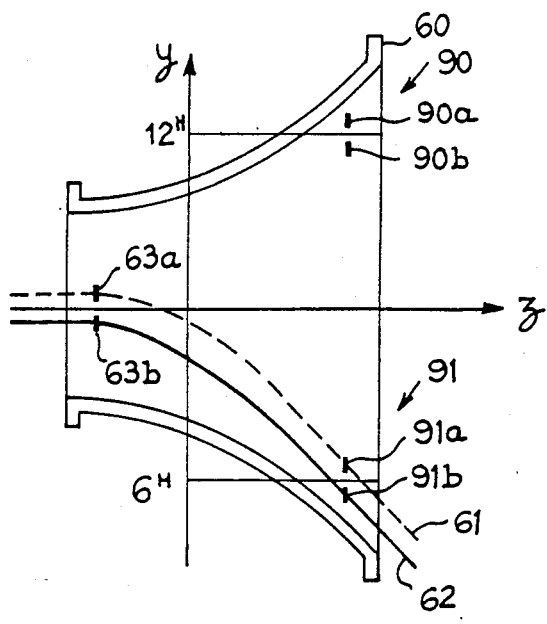

FIG. 9 represents a block diagram for measuring the vertical intersection parameter CV. The coils are situated in the plane y, z, and comprise a pair of coils 90 that measure the fluid gradient for the deflection at 12H and a pair of coils 91 for measuring the deflection at 6H. The pair of coils 63 is constituted by coils utilized for measuring the horizontal amplitude parameter as shown in FIG. 6.

In FIGS. 6 to 9, each pair of coils which are comprises two coils absolutely identical, and references are made by the marking of the pair of coils with an index a or b according to the particular coil of the pair.

Each coil is constituted by about twenty turns distributed in four layers mounted upon a face plate. According to the invention the measuring head is constituted by a body made of synthetic material in which the pairs of coils are sunk. In one embodiment, the coils are disposed in the body after boring with an accuracy to within one centimeter. However, the present invention can utilize any other type of sensor which is sensitive to the magnetic field.

Each parameter is thus measured by three pairs of coils. In fact, this corresponds to two samplings of the magnetic field according to the axis oz. In one variant of the invention, a supplementary pair of coils is disposed in a zone close to the line or raster deflection centres in order to acquire a third sampling. However, in the preferred embodiment, the measuring head of the device comprises two pairs of coils distributed as follows: two pairs of coils in the rear zone and eight pairs of coils in the front zone.

The acquisition of an accurate measurement of the asymmetric faults of convergences by a field gradient measurement using a limited number of points of the deflection volume depends very much upon the correct choice of the positions in the x, y plane and above all along the z of these points and the sensors. In the x, y plane the choice is simple. Each of the two coils of a sensor is positioned respectively on the passages of the red and blues paths (lateral channels) for the involved value z, the paths being those of the reference points 3H-9H-6H-12H. These paths are predetermined once and for all by a calculation, based on the steady field measurements made in the laboratory for the whole deflection volume of a reference deflection unit. The choice of "sampling planes" along the length of z, however, is more delicate and determinant.

The asymmetry of the deflection field defined in practice by references 22-23 with respect to an axis OZ can have various origins; this can be in particular a simple decentering of the windings caused by translation with sloping with respect to OZ or can be caused by incorrect assembly of the line windings, by raster or line coil anomalies, or by deformations of ferrites or line windings, these latter types of faults being relatively localized along z.

As a first approximation, the deflection field for each direction and constituted in each plane XY(z) is:
of a noted regular field Ho(z);
of a component $H_2(z)$ determining the self-convergence, the cushion or pad correction, etc.

This function $H_2(z)$ defines the nominal characteristics of the deflection unit including:
a component $H_1(z)$ that ideally should be at zero since it represents the lack of symmetry described above;
a component of a higher range, of limited object influence.

For each z along the axis ox the deflection field is defined by:

$$H_y = H_0(z) + H_1(z).X + H_2(z).X^2 + \ldots$$

and vertically along the length of oy the deflection field is defined by:

$$V_x = V_0(z) + V_1(z).Y + V_2(z).Y^2 + \ldots$$

If Hy and the horizontal amplitude parameter AH are considered, the measured field of each coil in a gradient collector thus will be:

in red (far left-hand gun)

$$HR = Ho + H_1(x-a) + H_2(x-a)^2 \text{ and}$$

in blue (far right-hand gun)

$$HB = Ho + H_1(x+a) + H_2(x+a)^2,$$

with 2a = the shift of the red-blue paths and x = position with respect to the axis of the deflection unit.

If the position of the central path (green) for the point 3H with respect to the ideal axis of the materialized tube defined by 22-23 is X, then:

$$x = X - d,$$

d being the distance or shift for a given Z between this axis and the magnetic axis of the deflection unit.

In this case, the gradient measured by a collector 3H is:

$$(HB - HR)_3 = 2aH_1 + 4(X-d)a\, H_2$$

and for 9H:

$$(HB - HR)_9 = -2aH_1 + 4(x+d)a\, H_2$$

The difference of the gradients 3H−9H expressing the local amplitude fault AH is thus:

$$AH = k(HB - HR)_3 - (HB - HR)_9 = k(4aH_1 - 8\, d.a.H)$$

In the rear zone, the paths being practically free of deflection, the collector 3H coincides with that corresponding to 9H, and a single collector will thus be utilized in practice. Since the signal delivered is halved, a gain supplement of 2 will be applied to the corresponding amplifier chain.

The expression for AH above shows that the disalignment d allows a setting off or compensation of lack of symmetric H1 locally, i.e., through decentering of the parabolic component H2. This is true locally in a segment dz. In fact, if z is considered on the whole of the path, the total $8fd(z)a(z)H_2(z)\, dz$ can equally compensate the total lack of symmetry of $4fa(z).H_1(z)dz$. The function (z) has generally a simple form since it corresponds to a gradient or a translation of the deflection unit with respect to the reference axis. Furthermore a(s) is very monotonous, indicating the convergence of the beams and it varies in the existence of fields H2 and H1.

The functions H1(z) and H2(z) are, on the contrary, more irregular. H2(z) forms part of the design of the product and is perfectly known and stable but changes sign twice along the length of z. Vertically the homolog V2 is frequently more monotonous and always negative. A proper balance AR-AV of the gains of the acquisition chains allows taking into consideration these facts.

Functions H1 and V2 are representative of the faults described above and depend upon the manufacturing process and the technology of the deflection unit. For each type of product, only a solid experimental analysis allows an operator to determine the number of sampling planes, their positions, and their possible proper balances, relative to the rear-front (coefficients).

Experience has shown that at least two complete planes (the device described in FIGS. 6 and 7, or three pairs of windings) were necessary; in one variant according to the invention complementary measuring points where added in the deflection centre zones, but only for a part of the parameters.

All that has been set out above with respect to the horizontal amplitude parameter is also appropriate for AV, CH, and CV. It will therefore be seen that four decenterings according to x and y, both line and raster, or $$d_{Tx},\ d_{Ty},\ d_{Lx},\ d_{Ly}$$

allow for the control of, respectively:

AV, CV, AH, CH

The second adjustment operation upon the definitive tube has the aim of setting AV and CV to zero through displacement of the whole of the deflection unit in which lines and raster are thus integral. A simulation cancelling out AH and CH when thus obtained is the appropriate values of:

$$d_{Tx} - d_{Lx} \text{ and } d_{Ty} - d_{Ly}$$

have been obtained during the first operation on the test tube in the prior art or according to the present invention. However, on a test tube according to the prior art the four movements:

$$d_{Tx},\ d_{Ty},\ d_{Lx},\ d_{Ly}$$

must be carried out mechanically, whereas in the case of the invention the present device has been greatly simplified by only mechanizing the displacement of the ferrite-raster assembly (FIG. 3). The effect of displacements $d_{Lx}$ on the convergence parameters is simply calculated from measurements and not materialized by a mechanical displacement. This is largely encouraged by the observation that the errors AV and AH as well as CV and CH remain generally linear between one another when dx and dy are caused to vary:

$$AV(dx) = a.AH(dx) + G(d_{Tx} - d_{Lx})$$

$$CV(dy) = f(d_{Ty} - d_{Ly}) + \beta.CH(dy)$$

The simultaneous cancelling out of the amplitudes and the interceptions on the final tube, by dx and dy, will be rendered possible by values of $$d_{Tx} - d_{Lx} \text{ and } d_{Ty} - d_{Ly}$$

where $$AV - a.AH = E_C \rightarrow 0$$

$$CV - \beta.CH = E_C \rightarrow 0$$

The combination of measurements AV and AH with a coefficient thereof returns the error signal $E_a$ that will allow a servo-device to adjust $d_{Tx} - d_{Lc}$, the function G being relatively monotonous.

Furthermore, the reference Q can, in certain cases, be different from zero, i.e.:

$$AV - a.AH - Q_a = E_a \rightarrow 0$$

The reasoning is identical for the intersections:

$$CH - \beta.CH - Q_c = E_c \rightarrow 0$$

Figure 10:
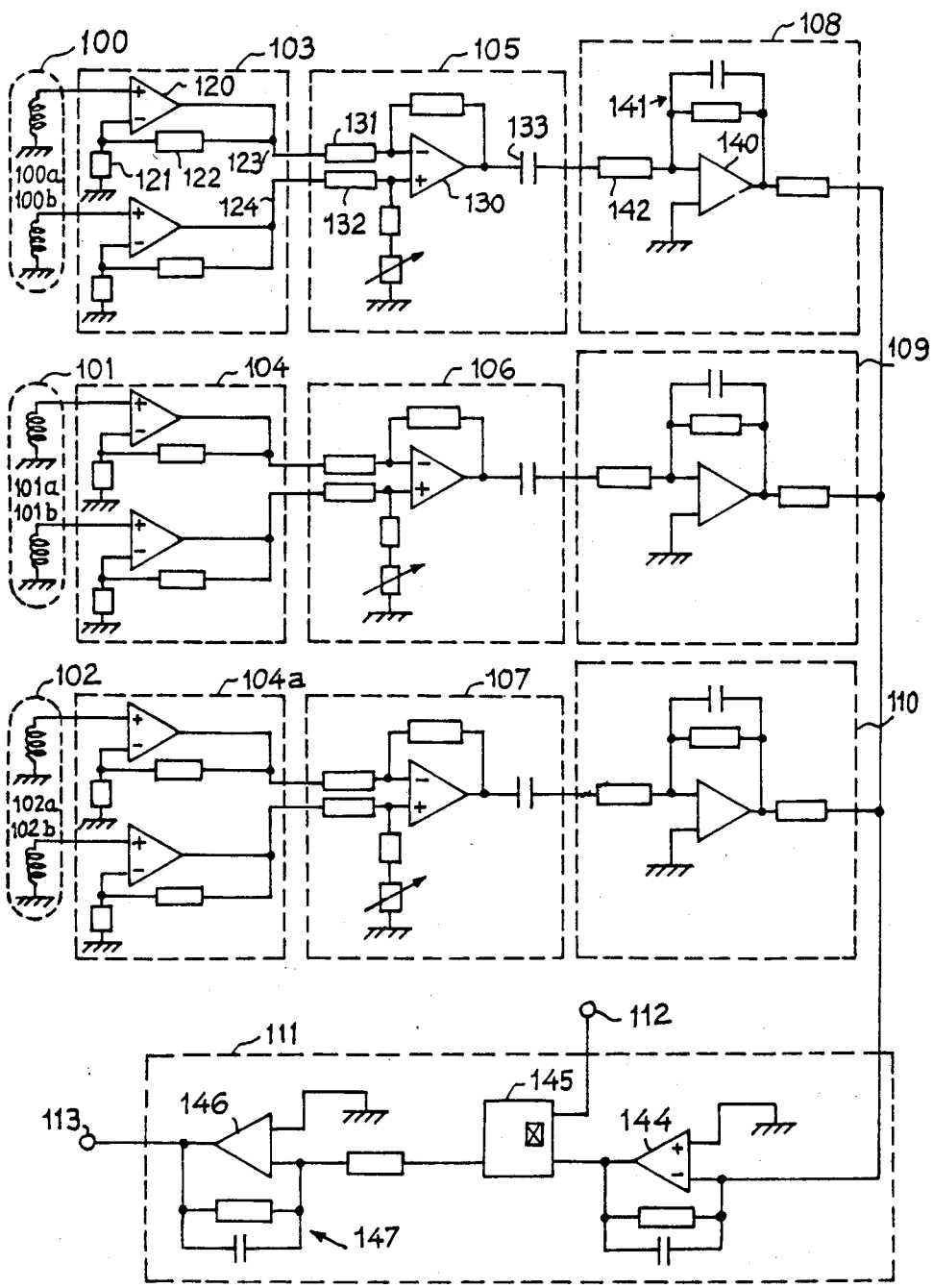
FIG. 10 is a diagram of an embodiment of a first circuit of the device according to the invention.

FIG. 10 represents a chain for elaborating on one of the parameters to be described. Each pair of coils 100, 101, 102 utilized to elaborate the signal 113 are represented. The pair of coils 100 is in the rear zone and thus corresponds to the pairs of coils 72 and 63 of the FIGS. 6 to 9. The coils 100 and 102 correspond to the right-hand and the left-hand coils in any one of the FIGS. 6 to 9. It will be noted that each of the lines connected to the pairs of coils is identical therefore only the upper chain of the drawing of FIG. 10 will be described. The pairs of coils are each connected to an amplifier assembly 103, 104. The outputs of each of these assemblies are connected to the inputs of the differentiator 105-107. At the output of these differentiators, the field gradients described above are obtained. These values are supplied to integrators 108-110, the outputs of which are connected together to the input of a circuit for producing a continuous component 113 that will act as an error signal for any one of the four parameters according to the allocation of the pairs of coils 100-102.

The amplifier 103 comprises for each of the coils 100a or 100b an operational amplifier 120 connected to a network of reaction resistances 121, 122 connected to the output 123 of the operational amplifier 120. Each adapted signal issuing from one of the amplifiers is supplied to an input of a differentiator constituted by an operational amplifier 130, the inputs of which are charged through resistances 131 or 132. A condenser 133 ensures a first filtering. Each of the differentiators is thereafter connected to a filter 108 that carries out a constant phase pass band filtering. Such a filter is constituted by an operational amplifier 140 charged through a network RC 141 connected in parallel and a resistance coil 142 at the hot input. The outputs of the three chains issuing from the coils 100-102 are grouped together at the input of the circuit 111.

The input of the circuit 111 is connected to an adder assembly constituted by an operational amplifier 144 the output of which supplies a total with integration through the network RC that counter-couples the hot point of the amplifier 144, the total resulting in a linear combination of the field gradients of each of the pairs of coils. The coefficients allocating the gradients that are simulated by the different gains in each of the stages 103, 105, 108 or 104, 106, 109 or 104, 107, 110 correspond to the influence coefficient on the front zone described above. In the circuit 111 the output of the adder assembly 144 is connected to a synchronous decoder 145, the other input of which is connected to a master oscillator at 112 responsible for the scanning or the simulation of the line or raster scanning. Therefore, the input 112 receives the line scanning frequency for the horizontal amplitude coefficients AH and horizontal intersection CH or the raster scanning frequency for the vertical intersection and vertical amplitude coefficients. The synchronous decoding supplies a detection output signal of which the continuous component is filtered by the filter cell 147 installed about the operational amplifier 146 (corresponding to coefficients $\alpha$, $\beta$ described above).

The circuit represented in FIG. 10 corresponds to the computer 31 shown in FIG. 3. Such a computer thus may operate upon analog signals. In another embodiment, however, the signal issuing from the collectors 100, 101, and 102 are numbered and supplied by an appropriate interface to a digital processor that can elaborate a signal 42 as shown in FIG. 3 in a digital form. Such digital error signals and correspond to the analog error signals described with reference to FIG. 10. The calculator 31 represented in FIG. 3 thus comprises four circuits similar to those of FIG. 10 in the case of an analog computer.

Figure 11:
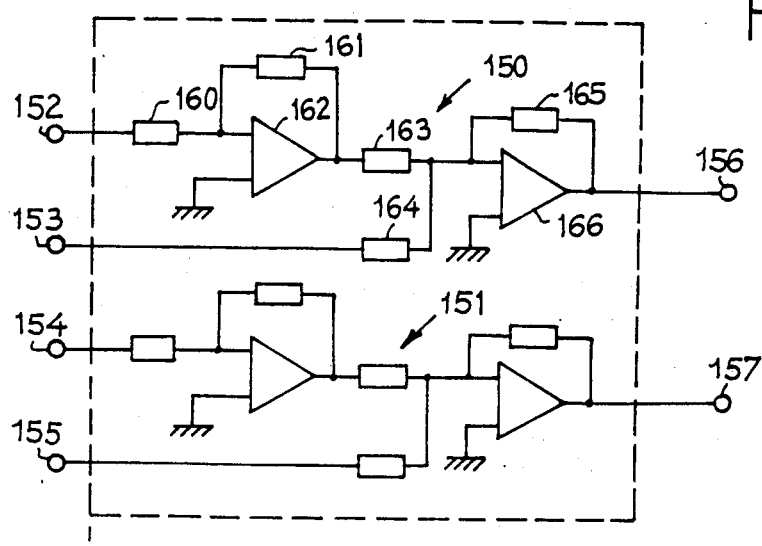
FIG. 11 is a diagram of an embodiment of a second circuit of the device according to the invention.

FIG. 11 represents a circuit adapted to provide two signals 156, 157 for servo-motors 33 or 29 of the embodiment shown in FIG. 3. Each of the four parameters calculated according to the circuits of FIG. 10, for example, are supplied to inputs 152 through 155 of the circuit of FIG. 11. Through addition, they are associated in a linear combination that electrically simulates the conditions so that the deflection unit is adjusted in an optimal way.

The circuit of FIG. 11 comprises two independent separated chains 150 and 151. The chain 150 comprises two inputs: 152, receiving the horizontal amplitude signal AH, and 153, receiving the vertical amplitude signal AV. The chain 151 receives through input 155 the horizontal intersection signal CH and through 154 the verticle intersection signal CV. The two chains being identical, only chain 150 will be described. The input 152 that receives the horizontal amplitude signal AH is connected through resistor 160 to a reversal amplifier 162 of unitary gain. The output of this amplifier is thus connected along with the input 153 to an adder constituted by the operational amplifier 166. The output signal 156 is a linear combination of the two inputs 152, 153, the coefficients of which depend upon the ratios of the resistances 163 to 165 and 164 to 165. The signal thus constituted can act to excite a feed interface of motors 29 or 33 of FIG. 3.

Figure 12:
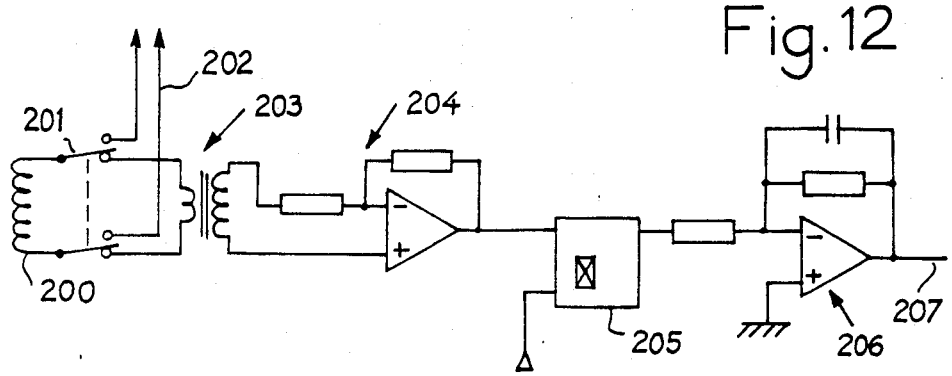
FIG. 12 is a diagram of an embodiment of a third circuit of the device according to the invention.

FIG. 12 represents an annexed circuit of the computer 31 of FIG. 3, also using the analog technique. According to this embodiment, prior to performing the described operations of the process according to the invention, it is first of all necessary to carry out an adjustment of the orthogonality of the line and raster coils so that the line and raster fields are effectively orthogonal. In order to do this, the raster coil is utilized as a line field collector. The raster amplifier 34 connected to the line 202 is disconnected by switch 201. The raster winding 200 is thus put at the input of a transformer 203 which in a preferred embodiment of the invention has a turn ratio of 250. The output of transformer 203 is connected to a high gain amplifier 204. The output of this amplifier is connected to a synchronous detector 205 the other input of which is connected to he line oscillator 37. As shown, in FIG. 12, a filtering cell of the continuous component 206 is utilized that supplies an error signal 207 that is cancelled out by rotation of the raster 24 relative to the separator 25. Such a servo-device, which has not been represented in FIG. 3, is easily realized by one skilled in the art.

Once the adjustment process has been achieved, the ferrite 24 is rendered temporally immobile on the separator so as to maintain the adjustment. In one embodiment, the ferrite is stuck onto the separator using sufficient heat.

We claim:

1. Process for adjusting a deflection unit for a television tube with three aligned guns, comprising the steps of:

1. disposing the deflection unit upon a head for measuring magnetic field gradients;
2. measuring these field gradients;
3. displacing about a central magnetic axis a support ferrite of a raster winding so as to obtain orthogonality of the raster with respect to line fields;
4. simulating an alignment of the deflection unit in a television tube by furnishing a voltage proportional to the angular shift between the axis of the head and each means axis of symmetry of the raster and line fields;
5. displacing the ferrite in at least one direction of a plane orthogonal to the axis of the measuring head in such a way as to cancel out the voltages proportional to the angular shifts; and
6. fixing, or steadying at least temporarily, the ferrite with respect to a line winding.

2. Process according to claim 1, wherein the adjustment of the orthogonality of the line and raster fields is first carried out by measuring the current induced in the raster winding by the line winding when connected to a scanning generator, and secondly by cancelling out this current through rotation of the ferrite bearing the raster winding.

3. Process according to claim 1, wherein for each of the horizontal intersection, vertical intersection, horizontal amplitude, and vertical amplitude parameters, a field gradient from the rear of the deflection unit and two field gradients from the front of the deflection unit are measured symmetrically on either side of the central magnetic axis and each of the parameters is measured through a linear combination of these three field gradients, the coefficients of the linear combination determining the relative influences of the rear and front zones of the deflection unit.

4. Process according to claim 3, wherein the displacement of the ferrite according to an axis x orthogonal to the axis of the measuring head is controlled in such a way as to cancel out an error signal constituted by the linear combination of the horizontal and vertical amplitude parameters.

5. Process according to claim 3, wherein the displacement of the ferrite according to an axis y orthogonal to the axis of the measuring head and axis x is controlled in such a way as to cancel out an error signal constituted by the linear combination of the vertical and horizontal intersection parameters.

6. Device for adjusting a deflection unit for a television tube with three aligned guns, comprising:
means for supporting and centering the deflection unit;
a measuring head comprising magnetic field gradient collectors in the front of the deflection unit and in the rear of the deflection unit;
line and raster windings disposed about said measuring head;
two supply lines for supplying line and raster scanning data to said line and raster windings, respectively;
a computer for calculating signals simulating the vertical and horizontal amplitude and vertical and horizontal intersection parameters representing a displacement error of the deflection unit; and
control circuit means responsive to said parameters for selectively displacing the line and raster windings in a plane orthogonal to a central axis of the deflection unit so as to cancel out the displacement error.

7. Device according to claim 6, wherein the field gradient collectors are constituted by pairs of coils.

8. Device according to claim 6, wherein the measuring head comprises two field gradient collectors in the rear of the deflection unit adjacent to the central axis of the deflection unit and eight field gradient collectors in the front of the deflection unit along an axis x of line scanning or an axis y of raster scanning, said axis x and said axis y being orthogonal to the central axis and to each other, the collectors collecting the magnetic field gradients as orthogonal fields by placing two collectors at opposite ends of the periphery of the deflection unit along axis x and axis y.

9. Device according to claim 6, wherein the computer comprises a circuit for calculating each of the parameters, each circuit comprising:
means for calculating the field gradient of each field gradient collector;
a pass-band filter for each field gradient calculated;
adding means for linearly combining the field gradients output by a collector in the rear of the deflection unit and two collectors in the front of the deflection unit, said two collectors being reserved for calculating the parameter;
a decoder synchronized to the line or raster frequency according to the calculated parameter; and
a filter outputting a continuous electrical component simulating the parameter.

10. Device according to claim 6, wherein the control circuit means comprises two chains, one chain associated with the displacement x along a first axis x and another chain associated with the displacement y, along a second axis y, said axis x and axis y being othogonal to each other and the central axis of the deflection unit, said one chain effecting a linear combination of the signals simulating the vertical and horizontal amplitude parameters and said another chain effecting a linear intersection of the signal simulating the vertical and horizontal intersection parameters.

11. Device according to claim 10, wherein each chain combines said respective parameters in a ratio defined by coefficients determined by resistances within each said chain.

12. Device according to claim 10, wherein servomotors carry out the displacement of the line and raster windings to cancel out servo-signals present at the outputs of the control circuit means.

13. Device according to claim 6, wherein the supporting and centering means comprises a horizontal bearing.

14. Device according to claim 6, wherein the supporting and centering means comprises a self-centering clamp which clamps the rear of the deflection unit.

* * * * *